(12) United States Patent
Minegishi et al.

(10) Patent No.: US 10,920,874 B2
(45) Date of Patent: Feb. 16, 2021

(54) VEHICLE

(71) Applicant: TOYOTA JIDOSHA KABUSHIKI KAISHA, Toyota (JP)

(72) Inventors: Shinichiro Minegishi, Toyota (JP); Shigeru Chiba, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 16/245,664

(22) Filed: Jan. 11, 2019

(65) Prior Publication Data

US 2019/0219151 A1 Jul. 18, 2019

(30) Foreign Application Priority Data

Jan. 15, 2018 (JP) .............................. JP2018-004302

(51) Int. Cl.
*B60W 20/50* (2016.01)
*F16H 59/60* (2006.01)
(Continued)

(52) U.S. Cl.
CPC .............. *F16H 59/60* (2013.01); *B60W 10/08* (2013.01); *B60W 10/10* (2013.01); *B60W 10/11* (2013.01); *B60W 10/18* (2013.01); *B60W 10/20* (2013.01); *B60W 10/24* (2013.01); *B60W 20/30* (2013.01); *B60W 20/50* (2013.01); *B60W 30/09* (2013.01); *B60W 30/146* (2013.01); *B60W 30/18036* (2013.01); *B60W 30/18154* (2013.01); *B60W 50/029* (2013.01); *F16H 59/0204* (2013.01); *F16H 59/105* (2013.01); *F16H 59/54* (2013.01); *F16H 59/58* (2013.01); *B60W 2050/0292* (2013.01); *B60W 2510/1005* (2013.01);
(Continued)

(58) Field of Classification Search
CPC ..... B60W 30/18027; B60W 30/18036; B60W 30/18109
See application file for complete search history.

(56) References Cited

U.S. PATENT DOCUMENTS

2013/0166162 A1* 6/2013 Minase .................. B60W 10/11
701/54
2016/0297431 A1* 10/2016 Eigel .................. B62D 15/0285
(Continued)

FOREIGN PATENT DOCUMENTS

| CN | 107097784 A | 8/2017 |
|---|---|---|
| CN | 107110348 A | 8/2017 |

(Continued)

OTHER PUBLICATIONS

U.S. Appl. No. 16/237,280, filed Dec. 31, 2018.

*Primary Examiner* — Derek D Knight
(74) *Attorney, Agent, or Firm* — Sughrue Mion, PLLC

(57) ABSTRACT

An electronic control unit of a vehicle recognizes a shift position based on a user's shift operation and controls a drive device based on the shift position, and an accelerator operation, a brake operation, and a steering operation by the user. When a predetermined abnormality that the shift position is not able to be recognized has occurred, the electronic control unit sets an abnormality-time shift position based on vehicle surroundings information and controls the drive device based on the abnormality-time shift position, the brake operation, and the steering operation.

15 Claims, 6 Drawing Sheets

(51) Int. Cl.
  *B60W 10/18* (2012.01)
  *B60W 10/10* (2012.01)
  *B60W 30/14* (2006.01)
  *B60W 10/20* (2006.01)
  *B60W 10/08* (2006.01)
  *B60W 10/24* (2006.01)
  *B60W 30/18* (2012.01)
  *B60W 20/30* (2016.01)
  *B60W 30/09* (2012.01)
  *B60W 10/11* (2012.01)
  *B60W 50/029* (2012.01)
  *F16H 59/02* (2006.01)
  *F16H 59/10* (2006.01)
  *F16H 59/54* (2006.01)
  *F16H 59/58* (2006.01)
  *F16H 59/00* (2006.01)

(52) U.S. Cl.
  CPC ... *B60W 2510/182* (2013.01); *B60W 2510/20* (2013.01); *B60W 2520/10* (2013.01); *B60W 2554/00* (2020.02); *B60W 2554/4041* (2020.02); *B60W 2554/801* (2020.02); *B60W 2710/081* (2013.01); *B60W 2710/083* (2013.01); *B60W 2710/086* (2013.01); *B60W 2710/1005* (2013.01); *B60W 2710/182* (2013.01); *B60W 2720/10* (2013.01); *F16H 2059/003* (2013.01)

(56) References Cited

U.S. PATENT DOCUMENTS

| | | |
|---|---|---|
| 2018/0003296 A1 | 1/2018 | Hoshino et al. |
| 2018/0209535 A1* | 7/2018 | Hase ............... F16H 59/105 |
| 2019/0071098 A1* | 3/2019 | Asakura ............ B60W 30/025 |
| 2019/0220006 A1* | 7/2019 | Ueno ............... B60W 20/50 |

FOREIGN PATENT DOCUMENTS

| | | |
|---|---|---|
| JP | 4997347 B1 | 8/2012 |
| JP | 2013-130130 A | 7/2013 |
| JP | 2017-067255 A | 4/2017 |

* cited by examiner

OBSTACLE IN FRONT

OBSTACLE IN FRONT AND RIGHT

VEHICLE

INCORPORATION BY REFERENCE

The disclosure of Japanese Patent Application No. 2018-004302 filed on Jan. 15, 2018 including the specification, drawings and abstract is incorporated herein by reference in its entirety.

BACKGROUND

1. Technical Field

The disclosure relates to a vehicle.

2. Description of Related Art

In the related art, a vehicle in which an output signal from a shift sensor that detects an operation position of a shift lever is input to a plurality of CPUs has been proposed as such a type of vehicle (for example, see Japanese Unexamined Patent Application Publication No. 2017-67255 (JP 2017-67255 A)). In this vehicle, even when an abnormality has occurred in some CPUs, the other CPUs determine a shift position based on an output signal from the shift sensor and allow traveling in a limp home mode based on the determined shift position.

SUMMARY

Such a vehicle can travel when the output signal from the shift sensor can be recognized by one CPU of a plurality of CPUs, but cannot travel when the output signal from the shift sensor cannot be recognized by any CPU.

The disclosure provides a vehicle that can travel even when a shift position based on a user's shift operation cannot be recognized.

According to an aspect of the disclosure, there is provided a vehicle including: a drive device for traveling; and an electronic control unit configured to recognize a shift position based on a user's shift operation and to control the drive device based on the shift position, and an accelerator operation, a brake operation, and a steering operation by the user. The electronic control unit is configured to set an abnormality-time shift position based on vehicle surroundings information control the drive device based on the abnormality-time shift position, the brake operation, and the steering operation, when a predetermined abnormality that the shift position is not able to be recognized has occurred.

In the vehicle according to the disclosure, the shift position based on a user's shift operation is recognized and the drive device is controlled based on the shift position and an accelerator operation, a brake operation, and a steering operation by the user. When a predetermined abnormality that the shift position is not able to be recognized has occurred, an abnormality-time shift position is set based on vehicle surroundings information and the drive device is controlled based on the abnormality-time shift position, a brake operation, and a steering operation. Accordingly, when a predetermined abnormality has occurred (the shift position cannot be recognized), the abnormality-time shift position is set based on the vehicle surroundings information and the vehicle can travel based on the abnormality-time shift position and the user's intention for traveling.

In the vehicle according to the disclosure, the electronic control unit may be configured to set the abnormality-time shift position based on at least one of current position information of the vehicle, map information, and surrounding space information as the vehicle surroundings information when the predetermined abnormality has occurred. In this way, it is possible to more appropriately set the abnormality-time shift position when a predetermined abnormality has occurred.

The electronic control unit may be configured to set a driving position as the abnormality-time shift position when the predetermined abnormality has occurred and there is no dead end in front of the vehicle. The electronic control unit may be configured to set a reversing position as the abnormality-time shift position when the predetermined abnormality has occurred and there is a dead end in front of the vehicle. In this way, it is possible to more appropriately set the abnormality-time shift position when a predetermined abnormality has occurred.

In the vehicle according to the disclosure, the electronic control unit may be configured to control the drive device such that the vehicle travels at a constant vehicle speed when the predetermined abnormality has occurred and the brake operation has not been performed. According to this configuration, when a predetermined abnormality has occurred, it is possible to enable the vehicle to travel stably.

In this case, the electronic control unit may be configured to control the drive device such that the vehicle travels at a first vehicle speed outside a crossing and control the drive device such that the vehicle travels at a second vehicle speed which is lower than the first vehicle speed inside the crossing when the predetermined abnormality has occurred and the brake operation has not been performed. According to this configuration, when a predetermined abnormality has occurred, it is possible to enable the vehicle to travel more safely in a crossing.

In the vehicle according to the disclosure, the electronic control unit may be configured to control the drive device based on the accelerator operation in addition to the abnormality-time shift position, the brake operation, and the steering operation when the predetermined abnormality has occurred and the accelerator operation is able to be recognized. According to this configuration, when a predetermined abnormality has occurred, it is possible to enable the vehicle to travel in consideration of an accelerator operation.

In the vehicle according to the disclosure, the electronic control unit may be configured to control the drive device such that the vehicle decelerates and stops without performing a brake operation when the predetermined abnormality has occurred and a stop sign is located in front of the vehicle, or when the predetermined abnormality has occurred and an obstacle is located in front of the vehicle in a crossing.

In the vehicle according to the disclosure, the electronic control unit may be configured to notify a user of the abnormality-time shift position when the predetermined abnormality has occurred. According to this configuration, when a predetermined abnormality has occurred, it is possible to enable a user to recognize the abnormality-time shift position.

In the vehicle according to the disclosure, the electronic control unit may include a first electronic control unit and a second electronic control unit. The first electronic control unit may be configured to recognize the shift position, an accelerator operation, and a brake operation and to generate a drive command for the drive device based on the shift position, an accelerator operation, and a brake operation. The second electronic control unit may be configured to control the drive device based on the drive command from the first electronic control unit. The second electronic control unit may be configured to recognize the brake operation.

The second electronic control unit may be configured to, when an abnormality has occurred in the first electronic control unit, generate the drive command based on the abnormality-time shift position and the brake operation recognized by the second electronic control unit, and control the drive device.

In the vehicle according to the disclosure, the electronic control unit may include a first electronic control unit and a second electronic control unit. The first electronic control unit may be configured to recognize the shift position. The second electronic control unit may be configured to recognize the accelerator operation and the brake operation. The second electronic control unit may be configured to control the drive device based on the shift position received from the first electronic control unit, an accelerator operation, and a brake operation. The second electronic control unit may be configured to control the drive device based on the abnormality-time shift position, the accelerator operation, and the brake operation when the shift position is not received from the first electronic control unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described with reference to the accompanying drawings.

Figure 1:
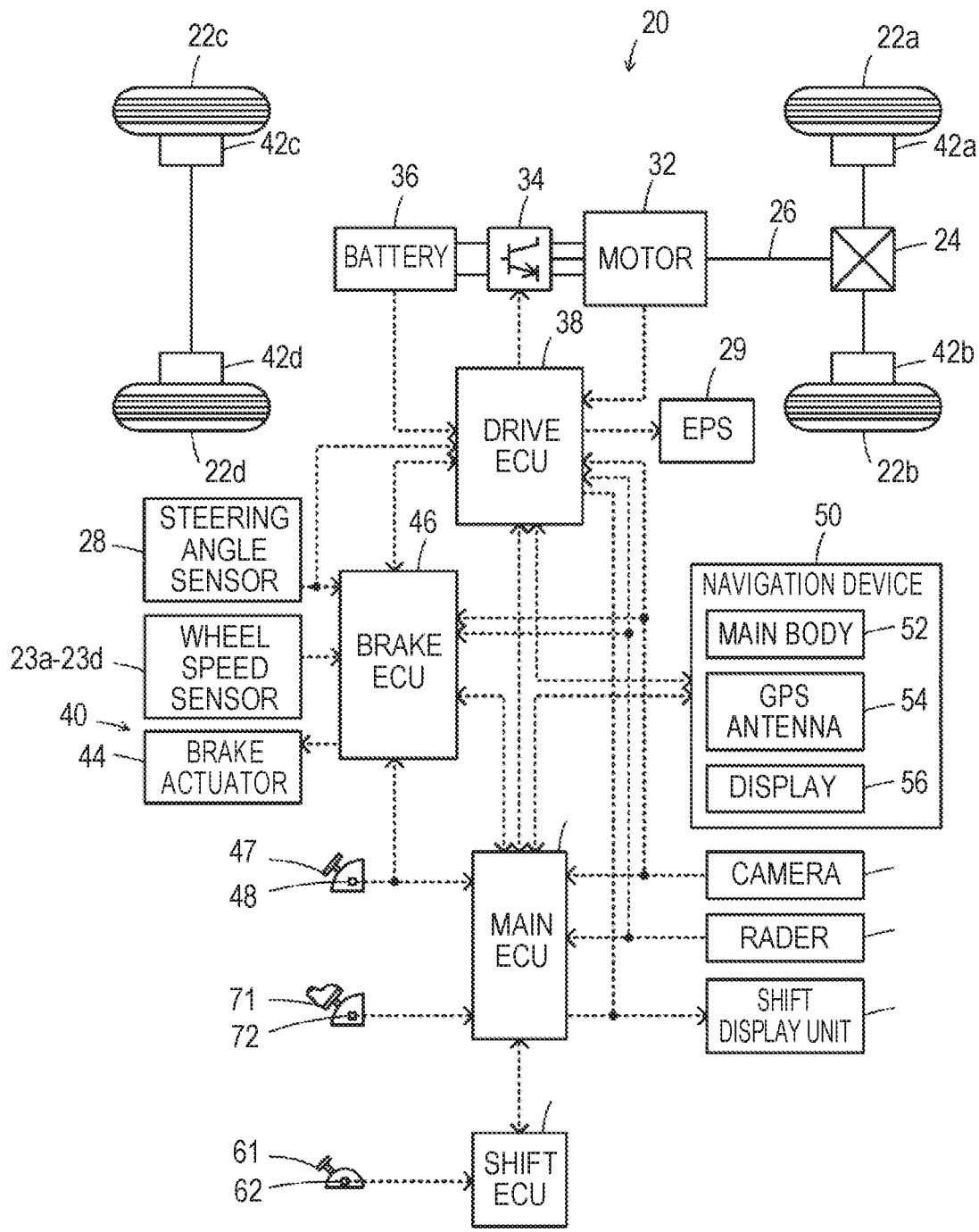
FIG. 1 is a diagram schematically illustrating a configuration of an electric vehicle 20 according to an embodiment of the disclosure.

FIG. 1 is a diagram schematically illustrating a configuration of an electric vehicle 20 according to an embodiment of the disclosure. As illustrated in the drawing, the electric vehicle 20 according to the embodiment includes a motor 32, an inverter 34, a battery 36 which is a power storage device, a drive electronic control unit (hereinafter referred to as a "drive ECU") 38, a hydraulic brake device 40, a brake electronic control unit (hereinafter referred to as a "brake ECU") 46, a navigation device 50, a shift electronic control unit (hereinafter referred to as a "shift ECU") 60, and a main electronic control unit (hereinafter referred to as a "main ECU") 70.

The motor 32 is constituted, for example, by a synchronous generator motor, and a rotor thereof is connected to a drive shaft 26 connected to driving wheels 22a and 22b via a differential gear 24. The motor 32 is rotationally driven by causing the drive ECU 38 to control switching a plurality of switching elements of the inverter 34. The battery 36 is constituted, for example, by a lithium-ion secondary battery or a nickel-hydride secondary battery and is connected to the inverter 34 via a power line.

Although not illustrated in the drawing, the drive ECU 38 is constituted by a microprocessor such as a CPU, and includes a ROM that stores a processing program, a RAM that temporarily stores data, input and output ports, and a communication port in addition to the CPU. Signals from various sensors that detect a state of the motor 32 (such as a rotational position of the rotor and phase currents of phases), signals from various sensors that detect a state of the battery 36 (such as a voltage, a current, and a temperature), a steering angle θw from a steering angle sensor 28 that detects a steering angle, vehicle surrounding space information from a camera 58 or a radar 59, and the like are input to the drive ECU 38 via the input port. A switching control signal to a plurality of switching elements of the inverter 34, a control signal to a power steering device (EPS) 29 that assists steering, a control signal to a shift display unit 80 that displays a shift position (when the shift display unit 80 cannot be controlled by the main ECU 70), and the like are output from the drive ECU 38 via the output port. The drive ECU 38 is connected to the brake ECU 46, the navigation device 50, and the main ECU 70 via the communication port.

The hydraulic brake device 40 includes brake wheel cylinders 42a to 42d that are attached to the driving wheels 22a and 22b and driven wheels 22c and 22d and a brake actuator 44 that adjusts hydraulic pressures of the brake wheel cylinders 42a to 42d and applies a braking force to the driving wheels 22a and 22b and the driven wheels 22c and 22d. Driving of the brake actuator 44 is controlled by the brake ECU 46.

Although not illustrated in the drawing, the brake ECU 46 is constituted by a microprocessor such as a CPU, and includes a ROM that stores a processing program, a RAM that temporarily stores data, input and output ports, and a communication port in addition to the CPU. A brake depression amount BP from a brake pedal position sensor 48 that detects an amount of depression of a brake pedal 47, wheel speeds Vwa to Vwd of the driving wheels 22a and 22b and the driven wheels 22c and 22d from wheel speed sensors 23a to 23d which are attached to the driving wheels 22a and 22b and the driven wheels 22c and 22d, space information surrounding the vehicle from the camera 58 or the radar 59, and the like are input to the brake ECU 46 via the input port. A drive control signal to the brake actuator 44 and the like are output from the brake ECU 46 via the output port. The brake ECU 46 calculates a vehicle speed V based on the wheel speeds Vwa to Vwd of the driving wheels 22a and 22b and the driven wheels 22c and 22d from the wheel speed sensors 23a to 23d. Calculation of the vehicle speed V is performed, for example, by setting a third largest value from the largest value of the wheel speeds Vwa to Vwd as the vehicle speed V or setting an average value of the wheel speeds Vwa to Vwd as the vehicle speed V. The brake ECU 46 is connected to the drive ECU 38 and the main ECU 70 via the communication port.

The navigation device 50 includes a main body 52 that has a storage medium such as a hard disk in which map information or the like is stored, a CPU, a ROM, a RAM, input and output ports, and a communication port, a GPS antenna 54 that receives information on a current location of the vehicle, and a touch panel type display 56 that displays the map information and a variety of information such as the current location of the vehicle and a scheduled traveling route to a destination and can receive various instructions from a user. In the map information, service information (for example, sightseeing information or parking lots), road information of predetermined traveling sections (for example, between traffic signs or between crossings), and the like are stored as a database. The road information includes distance information, road width information, lane number information, region information (downtown or outskirt), road type information (regular roads, expressways, or toll roads), gradient information, legal speed limits, and the number of signals. The navigation device 50 is connected to the drive ECU 38 and the main ECU 70 via the communication port.

When the display 56 is operated to set a destination by a user, the navigation device 50 sets a scheduled traveling route from a current location to a destination of the vehicle based on the map information and the current location and the destination of the vehicle, and displays the set scheduled traveling route on the display 56 to perform route guidance.

Although not illustrated in the drawing, the shift ECU 60 is constituted by a microprocessor such as a CPU, and includes a ROM that stores a processing program, a RAM that temporarily stores data, input and output ports, and a communication port in addition to the CPU. A shift position from a shift position sensor 62 that detects an operated position of a shift lever 61 is input to the shift ECU 60 via the input port. The shift ECU 60 sets one of a driving position (a D position), a reversing position (an R position), a parking position (a P position), and a neutral position (an N position) as the shift position SP based on the input shift position. The shift ECU 60 is connected to the main ECU 70 via the communication port.

Although not illustrated in the drawing, the main ECU 70 is constituted by a microprocessor such as a CPU, and includes a ROM that stores a processing program, a RAM that temporarily stores data, input and output ports, and a communication port in addition to the CPU. Signals from various sensors are input to the main ECU 70 via the input port. Examples of the signals input to the main ECU 70 include space information surrounding the vehicle from the camera 58 or the radar 59, an accelerator operation amount Acc from an accelerator pedal position sensor 72 that detects an amount of depression of an accelerator pedal 71, and a brake depression amount BP from a brake pedal position sensor 48 that detects an amount of depression of a brake pedal 47. A control signal to the shift display unit 80 or the like is output from the main ECU 70 via the output port. The main ECU 70 is connected to the drive ECU 38, the brake ECU 46, the navigation device 50, and the shift ECU 60 via the communication port.

In the electric vehicle 20 according to the embodiment having the above-mentioned configuration, the main ECU 70 periodically sets a required torque Td* required for the vehicle based on the shift position SP from the shift ECU 60, the accelerator operation amount Acc from the accelerator pedal position sensor 72, the brake depression amount BP from the brake pedal position sensor 48, and the vehicle speed V from the brake ECU 46, and sets a torque command Tm* for the motor 32 or a brake torque command Tbk* for the hydraulic brake device 40 based on the set required torque Td*. Subsequently, the main ECU 70 transmits the torque command Tm* for the motor 32 to the drive ECU 38 and transmits the brake torque command Tbk* for the hydraulic brake device 40 to the brake ECU 46. When the torque command Tm* for the motor 32 is received, the drive ECU 38 controls switching of a plurality of switching elements of the inverter 34 such that a torque based on the torque command Tm* is output from the motor 32 to the drive shaft 26. When the brake torque command Tbk* for the hydraulic brake device 40 is received, the brake ECU 46 controls the hydraulic brake device 40 such that a brake torque based on the brake torque command Tbk* is output from the hydraulic brake device 40 to the driving wheels 22a and 22b and the driven wheels 22c and 22d.

In the electric vehicle 20 according to the embodiment, the drive ECU 38 assists a user's steering operation using the power steering device 29.

Figure 2:
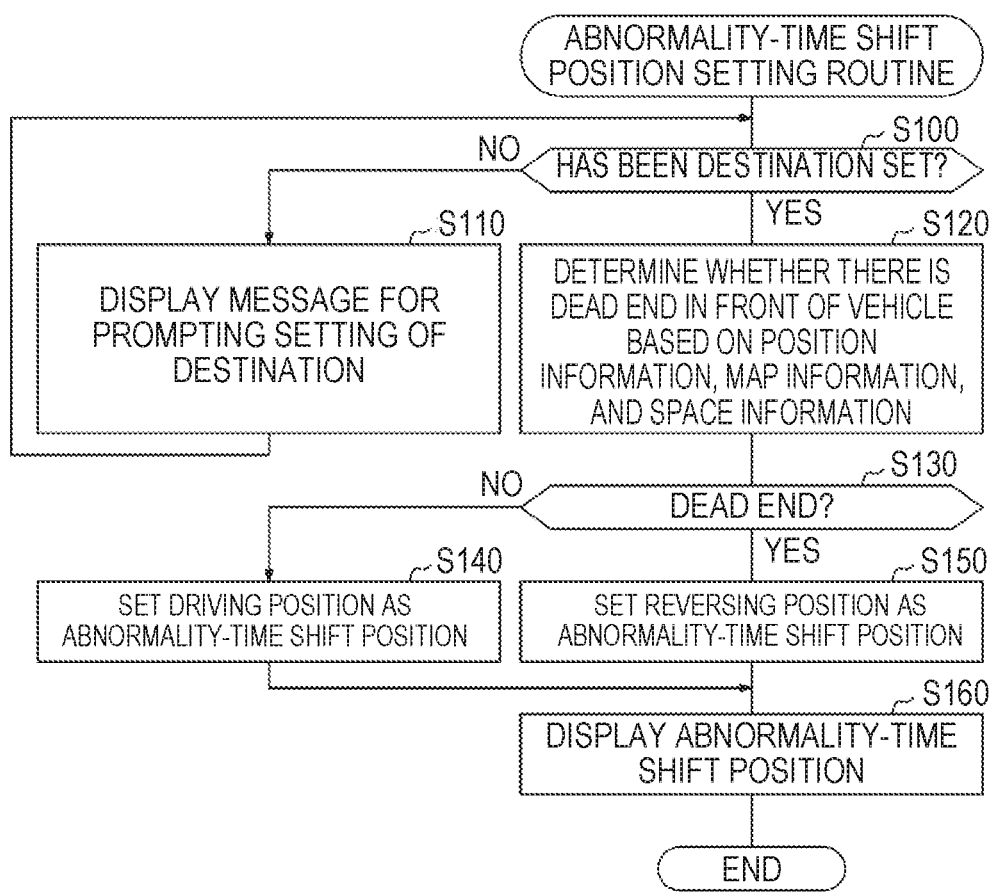
FIG. 2 is a flowchart illustrating an example of an abnormality-time shift position setting routine which is performed by a drive ECU 38.
Figure 3:
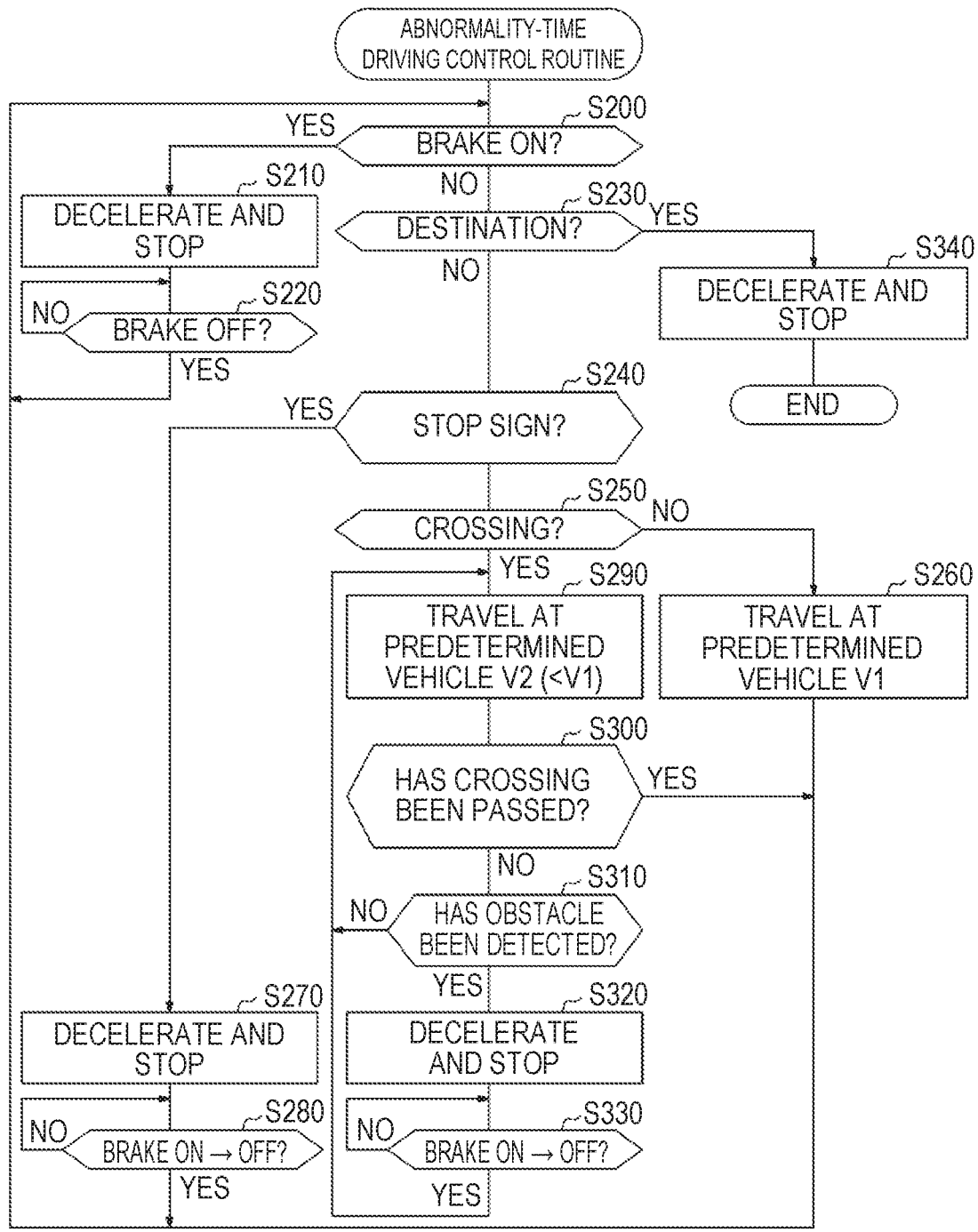
FIG. 3 is a flowchart illustrating an example of an abnormality-time driving control routine which is performed by a drive ECU 38.

Operations of the electric vehicle 20 according to the embodiment, particularly, operations when an abnormality has occurred in the main ECU 70 (when the shift position SP or the accelerator operation amount Acc cannot be received by any ECU), will be described below. FIG. 2 is a flowchart illustrating an example of an abnormality-time shift position setting routine which is performed by the drive ECU 38 and FIG. 3 is a flowchart illustrating an example of an abnormality-time driving control routine which is performed by the drive ECU 38. These will be sequentially described below. Here, "an abnormality-time shift position" is a shift position set when the abnormality described above has occurred.

The abnormality-time shift position setting routine illustrated in FIG. 2 will be first described. This routine is performed by the drive ECU 38 when the vehicle has stopped in a state in which an abnormality has occurred in the main ECU 70. In other words, this routine is performed every time when the vehicle has stopped and an abnormality has occurred in the main ECU 70. When no abnormality has occurred in the main ECU 70, the shift position SP is transmitted from the main ECU 70 to the drive ECU 38. When an abnormality has occurred in the main ECU 70 during traveling, the drive ECU 38 sets the shift position SP immediately before the occurrence of the abnormality in the main ECU 70 as an abnormality-time shift position SP2 and displays the set abnormality-time shift position SP2 on the shift display unit 80. Then, the drive ECU38 performs the abnormality-time shift position setting routine illustrated in FIG. 2 when the vehicle stops. Here, the shift position SP immediately before the occurrence of the abnormality in the main ECU 70 is the shift position SP which is set by the shift ECU 60 and is received via the main ECU 70.

When the abnormality-time shift position setting routine illustrated in FIG. 2 is performed, the drive ECU 38 determines whether a destination has been set by communication with the navigation device 50 (Step S100), displays a message for prompting setting of a destination (for example, a message of "Please set a destination.") on the display 56 of the navigation device 50 (Step S110) when it is determined that a destination has not been set, and returns the routine to Step S100. In this way, the routine waits until a user sets a destination.

When it is determined in Step S100 that a destination has been set, it is determined whether there is a dead end in front of the vehicle based on position information (information of a current location of the vehicle) or the map information (such as road information) from the navigation device 50 or space information surrounding the vehicle from the camera 58 or the radar 59 (Steps 120 and 130). The position information is an example of "current position information", the map information is an example of "map information" and the space information surrounding the vehicle is an example of "surrounding space information".

Determination of whether there is a dead end in front of the vehicle is performed, for example, by determining whether the vehicle is parked (stopped) forward or parked backward in a parking space of a parking lot and by determining whether the vehicle can turn in front of the vehicle in a space other than a parking space. In the embodiment, when the vehicle is parked forward in a parking space or when the vehicle cannot turn in front of the vehicle in a space other than a parking space, it is determined that there is a dead end in front of the vehicle. When the vehicle is parked backward in a parking space or when the vehicle can turn in front of the vehicle in a space other than a parking space, it is determined that there is no dead end in front of the vehicle.

Figure 4:
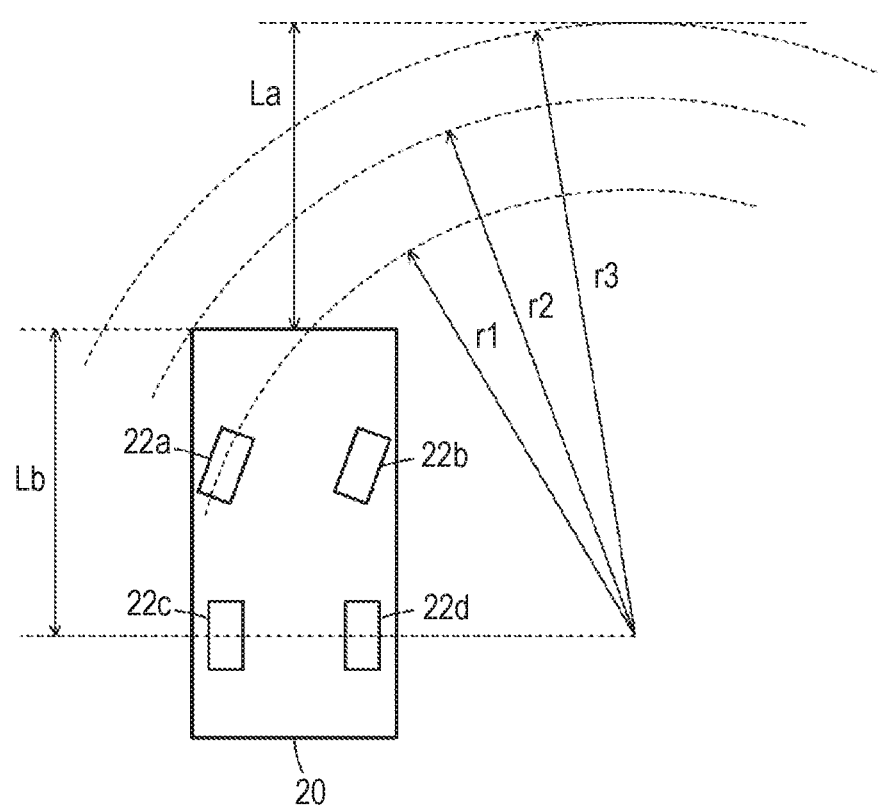
FIG. 4 is a diagram illustrating a predetermined distance La.
Figure 5A:
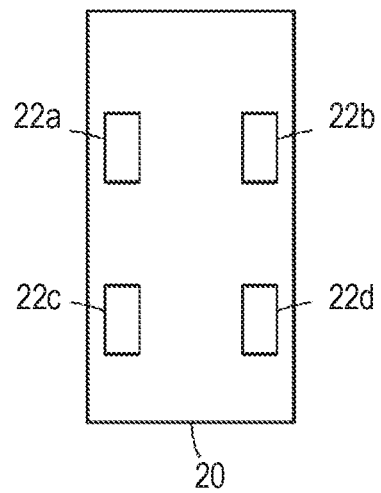
FIG. 5A is a diagram illustrating an example of a case in which the vehicle is determined to be not able to turn in front of the vehicle.
Figure 5B:
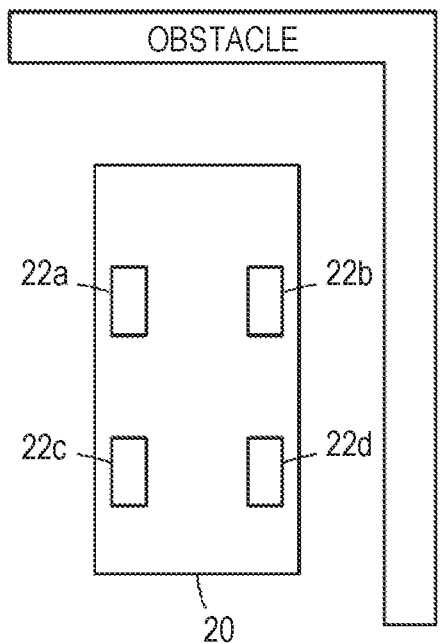
FIG. 5B is a diagram illustrating an example of a case in which the vehicle is determined to be not able to turn in front of the vehicle.
Figure 5C:
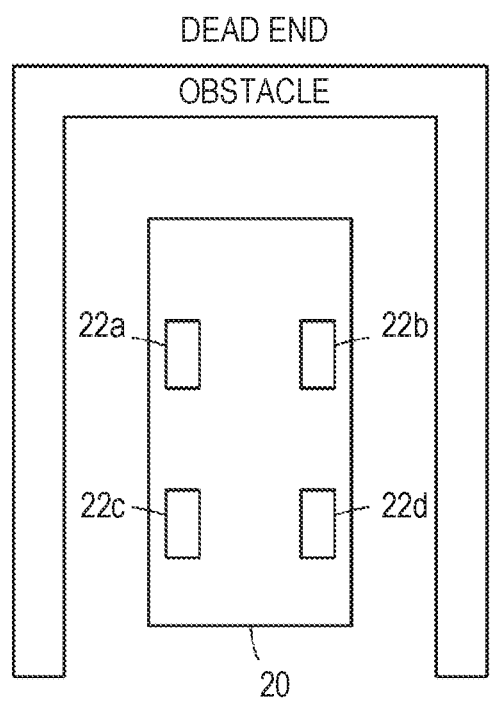
FIG. 5C is a diagram illustrating an example of a case in which the vehicle is determined to be not able to turn in front of the vehicle.

Here, determination of whether the vehicle can turn in front of the vehicle is performed, for example, by determining whether an obstacle such as another vehicle or a wall is present within a predetermined distance La in front of the vehicle. FIG. 4 is a diagram illustrating the predetermined distance La. In the drawing, "r1" represents a minimum turning radius of an outer vehicle wheel, "r2" represents a minimum turning radius of an outer vehicle body, and "r3" represents a turning radius obtained by adding a margin to the minimum turning radius of the vehicle body. For example, a difference (r3−Lb) between the turning radius r3 and a distance Lb between a foremost part of the vehicle and an axis penetrating the centers of the driven wheels 22c and 22d in a lateral direction of the vehicle is used as the predetermined distance La. FIGS. 5A to 5C are diagrams illustrating examples of a case in which it is determined that the vehicle cannot turn in front of the vehicle. Examples of the case in which it is determined that the vehicle cannot turn in front of the vehicle include a case in which an obstacle is present in front of the vehicle as illustrated in FIG. 5A, a case in which an obstacle is present in front of the vehicle and in the right of the vehicle as illustrated in FIG. 5B, and a case of a dead end in which obstacles are present in front of the vehicle, in the right of the vehicle, and in the left of the vehicle as illustrated in FIG. 5C.

When it is determined in Steps S120 and S130 that there is no dead end in front of the vehicle, the driving position (the D position) is set as the abnormality-time shift position SP2 (Step S140), the set abnormality-time shift position SP2 is displayed on the shift display unit 80 (Step S160), and then this routine ends. On the other hand, when it is determined in Steps S120 and S130 that there is a dead end in front of the vehicle, the reversing position (the R position) is set as the abnormality-time shift position SP2 (Step S150), the set abnormality-time shift position SP2 is displayed on the shift display unit 80 (Step S160), and then this routine ends. Through these processes, it is possible to set the abnormality-time shift position SP2 based on whether there is a dead end in front of the vehicle even when an abnormality has occurred in the main ECU 70.

The abnormality-time driving control routine illustrated in FIG. 3 will be described below. Execution of this routine is started by the drive ECU 38 when an abnormality has occurred in the main ECU 70. The drive ECU 38 assists a user's steering operation using the power steering device 29 in parallel with this routine. In the embodiment, when an abnormality has occurred in the main ECU 70 and an ignition switch (not illustrated) is turned off during stopping of the vehicle, a system is turned off (READY OFF).

When the abnormality-time driving control routine is performed, the drive ECU 38 determines whether the brake pedal 47 is depressed or not (hereinafter referred to as "the brake is in an ON state" and "the brake is in an OFF state") using the brake depression amount BP from the brake ECU 46 (Step S200). When it is determined that the brake is in an ON state, the motor 32 or the hydraulic brake device 40 is controlled such that the vehicle decelerates and stops (Step S210).

Specifically, the process of Step S210 is performed as follows by periodic cooperative control of the drive ECU 38 and the brake ECU 46 until the vehicle stops. The required torque Td* is set based on the brake depression amount BP and the torque command Tm* for the motor 32 or the brake torque command Tbk* for the hydraulic brake device 40 is set based on the set required torque Td*. Driving of the motor 32 is controlled using the torque command Tm* for the motor 32, and the hydraulic brake device 40 is controlled using the brake torque command Tbk* for the hydraulic brake device 40. The vehicle can stop based on the brake depression amount BP by this control.

When the vehicle stops, the abnormality-time shift position SP2 is set by the abnormality-time shift position setting routine illustrated in FIG. 2, and the routine waits until the brake is switched to the OFF state (Step S220). When the brake is switched to the OFF state, the routine returns to Step S200.

When it is determined in Step S200 that the brake is in the OFF state, it is determined whether a destination is located within a predetermined distance L1 in front of the vehicle, whether a stop sign is located within a predetermined distance L2 in front of the vehicle, or whether the vehicle has entered a crossing based on the position information (information of a current location of the vehicle) or the map information (such as road information) from the navigation device 50 or space information surrounding the vehicle from the camera 58 or the radar 59 (Steps S230 to S250). Here, the predetermined distance L1 is determined to be a distance in which the vehicle can stop smoothly at the destination. The predetermined distance L2 is determined to be a distance in which the vehicle can stop smoothly at the stop line.

When it is determined in Step S230 that a destination is not located within the predetermined distance L1 in front of the vehicle (which includes a case in which a destination is not set), it is determined in Step S240 that a stop sign is not located within the predetermined distance L2 in front of the vehicle, and it is determined in Step S250 that the vehicle has not entered a crossing, the motor 32 or the hydraulic brake device 40 is controlled such that the vehicle travels at a predetermined vehicle speed V1 (Step S260) and the routine returns to Step S200.

For example, 15 km/h, 20 km/h, or 25 km/h is used as the predetermined vehicle speed V1. The process of Step S260 is performed as follows by cooperative control of the drive ECU 38 and the brake ECU 46. The required torque Td* is set such that the vehicle speed V reaches the predetermined vehicle speed V1 and the torque command Tm* for the motor 32 or the brake torque command Tbk* for the hydraulic brake device 40 is set based on the set required torque Td*. Driving of the motor 32 is controlled using the torque command Tm* for the motor 32, and the hydraulic brake device 40 is controlled using the brake torque command Tbk* for the hydraulic brake device 40. The vehicle can travel stably at the predetermined vehicle speed V1 by this control.

When it is determined in Step S240 that a stop sign is located within the predetermined distance L2 in front of the vehicle, the motor 32 or the hydraulic brake device 40 is controlled such that the vehicle decelerates and stops (Step S270). Specifically, the process of Step S270 is performed as follows by periodic cooperative control of the drive ECU 38 and the brake ECU 46 until the vehicle stops. The required torque Td* is set such that the vehicle stops at the stop sign, the torque command Tm* for the motor 32 or the brake torque command Tbk* for the hydraulic brake device 40 is set based on the set required torque Td*, driving of the motor 32 is controlled using the torque command Tm* for the motor 32, and the hydraulic brake device 40 is controlled using the brake torque command Tbk* for the hydraulic brake device 40. The vehicle can stop at the stop sign by this control even when the brake is in the OFF state. When the brake is switched to the ON state during execution of the process of Step S270 (before the vehicle stops), the vehicle is made to stop in the same way as in the process of Step S210.

When the vehicle stops, the abnormality-time shift position SP2 is set by the abnormality-time shift position setting routine illustrated in FIG. 2, and the routine waits until the brake is switched from the ON state to the OFF state (Step S270). When the brake is switched from the ON state to the OFF state, the routine returns to Step S200. The brake may be switched to the ON state during execution of the process of Step S270. Therefore, it is not sure that the brake is in the ON state or in the OFF state when the vehicle stops. Accordingly, in order to ascertain a user's intention (whether the user intends to leave the vehicle in a stopped state or restarts traveling), when the brake is in the ON state at the time at which the vehicle has stopped, the routine returns to Step S200 when the brake is switched to the OFF state. When the brake is in the OFF state at the time at which the vehicle has stopped, the routine returns to Step S200 when the brake is switched to the OFF state after the brake has been switched to the ON state.

When it is determined in Step S250 that the vehicle has entered a crossing, the motor 32 or the hydraulic brake device 40 is controlled such that the vehicle travels at a predetermined vehicle speed V2 which is lower than the predetermined vehicle speed V1 (Step S290). Here, the predetermined vehicle speed V2 is determined to be a vehicle speed V at which the vehicle can travel safely at the crossing, and, for example, 8 km/h, 10 km/h, or 12 km/h is used. The process of Step S290 is performed as follows by cooperative control of the drive ECU 38 and the brake ECU 46. The required torque Td* is set such that the vehicle speed V reaches the predetermined vehicle speed V2 and the torque command Tm* for the motor 32 or the brake torque command Tbk* for the hydraulic brake device 40 is set based on the set required torque Td*. Driving of the motor 32 is controlled using the torque command Tm* for the motor 32, and the hydraulic brake device 40 is controlled using the brake torque command Tbk* for the hydraulic brake device 40. The vehicle can travel in the crossing by this control.

Subsequently, it is determined whether the vehicle has passed the crossing (Step S300). When it is determined that the vehicle has not passed the crossing (the vehicle is still in the crossing), it is determined whether an obstacle such as another vehicle, a person, or an object has been detected within a predetermined distance L3 in front of the vehicle (the front in the traveling direction) (Step S310). The routine returns to Step S290 when it is determined that an obstacle has not been detected at a short distance in front of the vehicle. Here, about several meters is set as the predetermined distance L3. In the process of Step S310, it may be determined whether an obstacle has disappeared during deceleration.

When it is determined in Step S310 that an obstacle has been detected in front of the vehicle, the motor 32 or the hydraulic brake device 40 is controlled such that the vehicle decelerates and stops (Step S320). Specifically, the process of Step S320 is performed as follows by periodic cooperative control of the drive ECU 38 and the brake ECU 46 until the vehicle stops. The required torque Td* is set such that the vehicle stops relatively rapidly and the torque command Tm* for the motor 32 or the brake torque command Tbk* for the hydraulic brake device 40 is set based on the set required torque Td*. Driving of the motor 32 is controlled using the torque command Tm* for the motor 32, and the hydraulic brake device 40 is controlled using the brake torque command Tbk* for the hydraulic brake device 40. The vehicle can stop safely in the crossing by this control even when the brake is in the OFF state. When the brake is switched to the ON state during execution of the process of Step S320 (before the vehicle has stopped), the vehicle is made to stop in the same way as in the process of Step S210.

When the vehicle stops, the abnormality-time shift position SP2 is set by the abnormality-time shift position setting routine illustrated in FIG. 2, and the routine waits until the brake is switched from the ON state to the OFF state (Step S330). When the brake is switched from the ON state to the OFF state, the routine returns to Step S290. Similarly to the process of Step S270, the process of Step S330 is a process of ascertaining a user's intention (whether the user intends to leave the vehicle in a stopped state or restarts traveling). The routine waits until the vehicle passes the crossing, and returns to Step S200 when it is determined in Step S300 that the vehicle has passed the crossing.

When it is determined in Step S230 that the destination is located within the predetermined distance L1 in front of the vehicle, the motor 32 or the hydraulic brake device 40 is controlled such that the vehicle decelerates and stops (Step S340). When the vehicle stops, this routine ends. Specifically, the process of Step S340 is performed as follows by periodic cooperative control of the drive ECU 38 and the brake ECU 46 until the vehicle stops. The required torque Td* is set such that vehicle stops at the destination and the torque command Tm* for the motor 32 or the brake torque command Tbk* for the hydraulic brake device 40 is set based on the set required torque Td*. Driving of the motor 32 is controlled using the torque command Tm* for the motor 32, and the hydraulic brake device 40 is controlled using the brake torque command Tbk* for the hydraulic brake device 40. The vehicle can stop at the destination by this control even when the brake is in the OFF state. When the brake is switched to the ON state during execution of the process of Step S340 (before the vehicle stops), the vehicle is made to stop in the same way as in the process of Step S210. Although not described in the abnormality-time shift position setting routine illustrated in FIG. 2, the parking position (the P position) may be set as the abnormality-time shift position SP2 when the vehicle stops around the destination.

In this way, even when an abnormality has occurred in the main ECU 70 (when the shift position SP or the accelerator operation amount Acc cannot be recognized by any ECU), the motor 32, the hydraulic brake device 40, and the power steering device 29 can be controlled based on the abnormality-time shift position SP2, a brake operation (the brake depression amount BP), and a steering operation (the steering angle θw) such that the vehicle can travel to the destination (travel in a limp home mode).

In the electric vehicle 20 according to the embodiment, when an abnormality has occurred in the main ECU 70 (when the shift position SP or the accelerator operation amount Acc cannot be recognized by any ECU), the abnormality-time shift position SP2 is set based on the position information (information of a current location of the vehicle) or the map information from the navigation device 50 or the space information surrounding the vehicle from the camera 58 or the radar 59. The motor 32, the hydraulic brake device 40, and the power steering device 29 are controlled based on the abnormality-time shift position SP2, a brake operation (the brake depression amount BP), and a steering operation (the steering angle θw). Accordingly, even when the shift position SP cannot be recognized, the abnormality-time shift position SP2 can be set and the vehicle can travel.

In the electric vehicle 20 according to the embodiment, the map information (such as road information) from the navigation device 50 is used in the abnormality-time shift position setting routine illustrated in FIG. 2 or the abnormality-time driving control routine illustrated in FIG. 3. However, instead, map information from an external system that can communicate with the electric vehicle 20 may be used. Examples of the external system include a cloud server and a mobile terminal (for example, a smartphone or a tablet) carried into the vehicle.

In the electric vehicle 20 according to the embodiment, the shift position SP or the abnormality-time shift position SP2 is displayed on the shift display unit 80, but may be displayed on the display 56 of the navigation device 50, a display of a mobile terminal carried into the vehicle, or the like. The shift position SP or the abnormality-time shift position SP2 may be output as voice from an onboard speaker, speaker of a mobile terminal carried into the vehicle, or the like.

In the electric vehicle 20 according to the embodiment, when the shift position SP or the accelerator operation amount Acc cannot be recognized by any ECU and the brake is in the OFF state, the motor 32 or the hydraulic brake device 40 is controlled such that the vehicle travels at the predetermined vehicle speed V1 outside a crossing, and the motor 32 or the hydraulic brake device 40 is controlled such that the vehicle travels at the predetermined vehicle speed V2 lower than the predetermined vehicle speed V1 inside a crossing. However, when the brake is in the OFF state, the motor 32 or the hydraulic brake device 40 may be controlled such that the vehicle travels at a constant speed outside a crossing and inside the crossing.

In the electric vehicle 20 according to the embodiment, when the shift position SP or the accelerator operation amount Acc cannot be recognized by any ECU and the brake is in the OFF state, the motor 32 or the hydraulic brake device 40 is controlled such that the vehicle travels at the predetermined vehicle speed V1 or the predetermined vehicle speed V2. However, when the shift position SP cannot be recognized by any ECU, but the accelerator operation amount Acc can be recognized by the main ECU 70 and the brake is in the OFF state, traveling of the vehicle may be controlled with the required torque Td* based on the accelerator operation amount Acc. Then, the vehicle can travel based on the accelerator operation amount Acc. Here, examples of the case in which the shift position SP cannot be recognized by any ECU but the accelerator operation amount Acc can be recognized by the main ECU 70 include: a case in which an abnormality has occurred in the shift lever 61, a case in which an abnormality has occurred in the shift position sensor 62, a case in which an abnormality has occurred in the shift ECU 60, a case in which a signal abnormality between the shift position sensor 62 and the shift ECU 60 has occurred, and a case in which a communication abnormality between the shift ECU 60 and the main ECU 70 has occurred. When the shift position SP cannot be recognized by any ECU but the accelerator operation amount Acc can be recognized by the main ECU 70, the abnormality-time shift position setting routine illustrated in FIG. 2 or the abnormality-time driving control routine illustrated in FIG. 3 may be performed by the main ECU 70 instead of the drive ECU 38.

In the electric vehicle 20 according to the embodiment, when the shift position SP cannot be recognized by any ECU, the abnormality-time shift position SP2 is set on the premise that a destination has been set. However, even when a destination is not set, the abnormality-time shift position SP2 may be set. In this case, even when a destination has not been set, the vehicle can travel. In this case, the processes of Steps S230 and S340 in the abnormality-time driving control routine illustrated in FIG. 3 can be omitted.

In the electric vehicle 20 according to the embodiment, when the shift position SP cannot be recognized by any ECU, the brake is in the OFF state, and the vehicle is located in the vicinity of a destination or in the vicinity of a stop sign or an obstacle has been detected in a crossing, the motor 32 or the hydraulic brake device 40 is controlled such that the vehicle decelerates and stops. However, when the brake is in the ON state, the motor 32 or the hydraulic brake device 40 may be controlled such that the vehicle decelerates and stops. In this case, the processes of Steps S230 and S340 in the abnormality-time driving control routine illustrated in FIG. 3 can be omitted, the processes of Steps S240, S270, and S280 can be omitted, or the processes of Steps S310 to S330 can be omitted.

The electric vehicle 20 according to the embodiment includes the drive ECU 38, the brake ECU 46, the shift ECU 60, and the main ECU 70, but at least two thereof may be constituted as a single electronic control unit.

In the embodiment, the electric vehicle 20 includes the motor 32 for traveling, but the disclosure may be applied to a configuration of a hybrid vehicle including an engine in addition to the motor 32. An example of a configuration of the hybrid vehicle is a configuration in which the motor 32 is connected to the drive shaft 26 connected to the driving wheels 22a and 22b, an engine and a power generator are connected to the drive shaft 26 via a planetary gear, and electric power is transmitted between the motor 32 or the power generator and the battery 36. A configuration in which a transmission is provided between the drive shaft 26 and the motor 32 and an engine is connected to the motor 32 via a clutch may be employed. A configuration in which the motor 32 is connected to the drive shaft 26, a power generator is connected to an engine, and electric power is transmitted between the motor 32 or the power generator and the battery 36 may be employed.

Correspondence between principal elements in the embodiment and principal elements in the claims will be described below. The motor 32 or the inverter 34, the battery 36, the hydraulic brake device 40, the power steering device 29 in the embodiment are an example of a "drive device," and the drive ECU 38, the brake ECU 46, the shift ECU 60, and the main ECU 70 are an example of an "electronic control unit." The shift ECU 60 and the main ECU 70 are an example of a "first electronic control unit," and the drive ECU 38 and the brake ECU 46 are an example of a "second electronic control unit." In another aspect, the shift ECU 60 is an example of a "first electronic control unit," and the main ECU 70, the drive ECU 38, and the brake ECU 46 are an example of a "second electronic control unit." Further, "notification of the abnormality-time shift position" may be performed by displaying the abnormality-time shift position on a display of an onboard device or a mobile terminal, outputting sound from a speaker of the onboard device or the mobile terminal, or the like. Examples of the mobile terminal include a smartphone and a tablet that can communicate with the vehicle and are being carried in the vehicle.

While an embodiment of the disclosure has been described above, the disclosure is not limited to the embodiment and can be modified in various forms without departing from the gist of the disclosure.

The disclosure is applicable to for the vehicle manufacturing industry.

What is claimed is:

1. A vehicle comprising:
    a drive device for traveling; and
    an electronic control unit configured to recognize a shift position based on a user's shift operation and to control the drive device based on the shift position, and an accelerator operation, a brake operation, and a steering operation by the user, the electronic control unit being configured to set an abnormality-time shift position based on vehicle surroundings information and to control the drive device based on the abnormality-time shift position, the brake operation, and the steering operation when a predetermined abnormality occurs such that the shift position is not able to be recognized.

2. The vehicle according to claim 1, wherein the electronic control unit is configured to set the abnormality-time shift position based on at least one of current position information of the vehicle, map information, and surrounding space information, as the vehicle surroundings information, when the predetermined abnormality has occurred.

3. The vehicle according to claim 1, wherein the electronic control unit is configured to set a driving position as the abnormality-time shift position when the predetermined abnormality has occurred and there is no dead end in front of the vehicle,
    the electronic control unit is configured to set a reversing position as the abnormality-time shift position when the predetermined abnormality has occurred and there is a dead end in front of the vehicle.

4. The vehicle according to claim 1, wherein the electronic control unit is configured to control the drive device such that the vehicle travels at a constant vehicle speed when the predetermined abnormality has occurred and the brake operation has not been performed.

5. The vehicle according to claim 4, wherein the electronic control unit is configured to control the drive device such that the vehicle travels at a first vehicle speed outside a crossing and to control the drive device such that the vehicle travels at a second vehicle speed which is lower than the first vehicle speed inside the crossing, when the predetermined abnormality has occurred and the brake operation has not been performed.

6. The vehicle according to claim 1, wherein the electronic control unit is configured to control the drive device based on the accelerator operation in addition to the abnormality-time shift position, the brake operation, and the steering operation when the predetermined abnormality has occurred and the accelerator operation is able to be recognized.

7. The vehicle according to claim 1, wherein the electronic control unit is configured to notify the user of the abnormality-time shift position when the predetermined abnormality has occurred.

8. The vehicle according to claim 7, further comprising a display unit, and wherein the electronic control unit causes the abnormality-time shift position to be displayed on the display unit to notify the user of the abnormality-time shift position.

9. The vehicle according to claim 1, wherein the electronic control unit includes
    a first electronic control unit configured to recognize the shift position, the accelerator operation, and the brake operation and to generate a drive command for the drive device based on the shift position, the accelerator operation, and the brake operation, and
    a second electronic control unit configured to control the drive device based on the drive command from the first electronic control unit, the second electronic control unit being configured to recognize the brake operation, and the second electronic control unit being configured to, when an abnormality has occurred in the first electronic control unit, generate the drive command based on the abnormality-time shift position and the brake operation recognized by the second electronic control unit, and control the drive device.

10. The vehicle according to claim 1, wherein the electronic control unit includes
    a first electronic control unit configured to recognize the shift position, and
    a second electronic control unit configured to recognize the accelerator operation and the brake operation, the second electronic control unit being configured to control the drive device based on the shift position received from the first electronic control unit, the accelerator operation, and the brake operation, and the second electronic control unit being configured to control the drive device based on the abnormality-time shift position, the accelerator operation, and the brake operation when the shift position is not received from the first electronic control unit.

11. The vehicle according to claim 1, further comprising at least one of a camera and radar for providing the vehicle surroundings information.

12. The vehicle according to claim 1, wherein the drive device comprises at least one of a motor, an inverter, a battery, a hydraulic brake device and a power steering device.

13. The vehicle according to claim 12, wherein the device includes the battery and the inverter connected to the battery.

14. The vehicle according to claim 13, wherein the battery is one of a lithium-ion secondary battery and a nickel-hydride secondary battery.

15. The vehicle according to claim 1, wherein the vehicle is an electric vehicle.

* * * * *